(12) United States Patent
Dernoncourt

(10) Patent No.: US 11,011,157 B2
(45) Date of Patent: May 18, 2021

(54) ACTIVE LEARNING FOR LARGE-SCALE SEMI-SUPERVISED CREATION OF SPEECH RECOGNITION TRAINING CORPORA BASED ON NUMBER OF TRANSCRIPTION MISTAKES AND NUMBER OF WORD OCCURRENCES

(71) Applicant: ADOBE INC., San Jose, CA (US)

(72) Inventor: Franck Dernoncourt, Sunnyvale, CA (US)

(73) Assignee: ADOBE INC., San Jose, CA (US)

(*) Notice: Subject to any disclaimer, the term of this patent is extended or adjusted under 35 U.S.C. 154(b) by 79 days.

(21) Appl. No.: 16/189,238

(22) Filed: Nov. 13, 2018

(65) Prior Publication Data

US 2020/0152175 A1 May 14, 2020

(51) Int. Cl.
*G10L 25/48* (2013.01)
*G10L 15/26* (2006.01)
*G10L 15/197* (2013.01)
*G10L 15/06* (2013.01)
*G10L 15/07* (2013.01)

(52) U.S. Cl.
CPC .......... *G10L 15/075* (2013.01); *G10L 15/197* (2013.01); *G10L 15/26* (2013.01); *G10L 15/063* (2013.01)

(58) Field of Classification Search
CPC ....... G10L 25/48; G10L 15/26; G10L 15/197; G10L 15/063; G06K 9/348; G06F 40/279
USPC .................................... 704/235, 9, 244, 278
See application file for complete search history.

(56) References Cited

U.S. PATENT DOCUMENTS

| 2004/0010409 | A1  | 1/2004 | Ushida et al.           |
| 2006/0149558 | A1* | 7/2006 | Kahn .............. G10L 15/18 704/278 |
| 2014/0067394 | A1* | 3/2014 | Abuzeina ......... G10L 15/197 704/244 |

(Continued)

OTHER PUBLICATIONS

Akkaya, et al., "Amazon Mechanical Turk for Subjectivity Word Sense Disambiguation," Proceedings of the NAACL HLT 2010 Workshop on Creating Speech and Language Data with Amazon's Mechanical Turk. Jun. 2010. pp. 195-203.

(Continued)

*Primary Examiner* — Farzad Kazeminezhad
(74) *Attorney, Agent, or Firm* — Finch & Maloney PLLC

(57) ABSTRACT

Techniques are disclosed for generating ASR training data. According to an embodiment, impactful ASR training corpora is generated efficiently, and the quality or relevance of ASR training corpora being generated is increased by leveraging knowledge of the ASR system being trained. An example methodology includes: selecting one of a word or phrase, based on knowledge and/or content of said ASR training corpora; presenting a textual representation of said word or phrase; receiving a speech utterance that includes said word or phrase; receiving a transcript for said speech utterance; presenting said transcript for review (to allow for editing, if needed); and storing said transcript and said audio file in an ASR system training database. The selecting may include, for instance, selecting a word or phrase that is under-represented in said database, and/or based upon an n-gram distribution on a language, and/or based upon known areas that tend to incur transcription mistakes.

17 Claims, 12 Drawing Sheets

(56) References Cited

U.S. PATENT DOCUMENTS

| | | | | |
|---|---|---|---|---|
| 2014/0278354 | A1* | 9/2014 | Ganong, III | G10L 15/26 704/9 |
| 2015/0006170 | A1* | 1/2015 | Caskey | G10L 25/48 704/235 |
| 2019/0325247 | A1* | 10/2019 | Ordonez | G06K 9/348 |
| 2020/0020319 | A1* | 1/2020 | Malhotra | G06F 40/279 |

OTHER PUBLICATIONS

Ambati,Vamshi and Stephan Vogel, "Can Crowds Build Parallel Corpora for Machine Translation Systems?" Proceedings of the NAACL HLT 2010 Workshop on Creating Speech and Language Data with Amazon's Mechanical Turk. Jun. 2010. pp. 62-65.

Average typing speed infographic, Retrieved from the Internet at URL: https://www.ratatype.com/learn/average-typing-speed/ on Dec. 20, 2018. 4 pages.

Bloodgood, Michael and Chris Callison-Burch, "Using Mechanical Turk to Build Machine Translation Evaluation Sets," Proceedings of the NAACL HLT 2010 Workshop on Creating Speech and Language Data with Amazon's Mechanical Turk. Jun. 2010. pp. 208-211.

Buzek, Olivia and Philip Resnik, "Error Driven Paraphrase Annotation using Mechanical Turk," Proceedings of the NAACL HLT 2010 Workshop on Creating Speech and Language Data with Amazon's Mechanical Turk. Jun. 2010. pp. 217-221.

Allison-Burch, Chris and Mark Dredze, "Creating Speech and Language Data With Amazon's Mechanical Turk," Proceedings of the NAACL HLT 2010 Workshop on Creating Speech and Language Data with Amazon's Mechanical Turk. Jun. 2010. pp. 1-12.

Chang, Jonathan, "Not-So-Latent Dirichlet Allocation: Collapsed Gibbs Sampling Using Human Judgments," Proceedings of the NAACL HLT 2010 Workshop on Creating Speech and Language Data with Amazon's Mechanical Turk. Jun. 2010. pp. 131-138.

"Correct recognition results of Google Speech API", posted to Internet at URL: https://stackoverflow.com/questions/40299921/correct-recognition-results-of-google-speech-api on Oct. 28, 2016. 1 page.

Denkowski, Michael and Alon Lavie, "Exploring Normalization Techniques for Human Judgments of Machine Translation Adequacy Collected Using Amazon Mechanical Turk," Proceedings of the NAACL HLT 2010 Workshop on Creating Speech and Language Data with Amazon's Mechanical Turk. Jun. 2010. pp. 57-61.

Denkowski, et al., "Turker-Assisted Paraphrasing for English-Arabic Machine Translation," Proceedings of the NAACL HLT 2010 Workshop on Creating Speech and Language Data with Amazon's Mechanical Turk. Jun. 2010. pp. 66-70.

Evanini, et al., "Using Amazon Mechanical Turk for Transcription of Non-Native Speech," Proceedings of the NAACL HLT 2010 Workshop on Creating Speech and Language Data with Amazon's Mechanical Turk. Jun. 2010. pp. 53-56.

Finin, et al., "Annotating Named Entities in Twitter Data with Crowdsourcing," Proceedings of the NAACL HLT 2010 Workshop on Creating Speech and Language Data with Amazon's Mechanical Turk. Jun. 2010. pp. 80-88.

Gao, Qin and Stephan Vogel, "Consensus versus Expertise: A Case Study of Word Alignment with Mechanical Turk," Proceedings of the NAACL HLT 2010 Workshop on Creating Speech and Language Data with Amazon's Mechanical Turk. Jun. 2010. pp. 30-34.

Gillick, Dan and Yang Liu, "Non-Expert Evaluation of Summarization Systems is Risky," Proceedings of the NAACL HLT 2010 Workshop on Creating Speech and Language Data with Amazon's Mechanical Turk. Jun. 2010. pp. 148-151.

Gordon, et al., "Evaluation of Commonsense Knowledge with Mechanical Turk," Proceedings of the NAACL HLT 2010 Workshop on Creating Speech and Language Data with Amazon's Mechanical Turk. Jun. 2010. pp. 159-162.

Gormley, et al, "Non-Expert Correction of Automatically Generated Relation Annotations," Proceedings of the NAACL HLT 2010 Workshop on Creating Speech and Language Data with Amazon's Mechanical Turk. Jun. 2010. pp. 204-207.

Grady, Catherine and Matthew Lease, "Crowdsourcing Document Relevance Assessment with Mechanical Turk," Proceedings of the NAACL HLT 2010 Workshop on Creating Speech and Language Data with Amazon's Mechanical Turk. Jun. 2010. pp. 172-179.

Heilman, Michael and Noah A. Smith, "Rating Computer-Generated Questions with Mechanical Turk," Proceedings of the NAACL HLT 2010 Workshop on Creating Speech and Language Data with Amazon's Mechanical Turk. Jun. 2010. pp. 35-40.

Higgins, et al., "MTurk Crowdsourcing: A Viable Method for Rapid Discovery of Arabic Nicknames?" Proceedings of the NAACL HLT 2010 Workshop on Creating Speech and Language Data with Amazon's Mechanical Turk. Jun. 2010. pp. 89-92.

Irvine, Ann and Alexandre Klementiev, "Using Mechanical Turk to Annotate Lexicons for Less Commonly Used Languages," Proceedings of the NAACL HLT 2010 Workshop on Creating Speech and Language Data with Amazon's Mechanical Turk. Jun. 2010. pp. 108-113.

Jha, et al., "Corpus Creation for New Genres: A Crowdsourced Approach to PP Attachment," Proceedings of the NAACL HLT 2010 Workshop on Creating Speech and Language Data with Amazon's Mechanical Turk. Jun. 2010. pp. 13-20.

Kunath, Stephen A., and Steven H. Weinberger, "The Wisdom of the Crowd's Ear: Speech Accent Rating and Annotation with Amazon Mechanical Turk," Proceedings of the NAACL HLT 2010 Workshop on Creating Speech and Language Data with Amazon's Mechanical Turk. Jun. 2010. pp. 168-171.

Lane, et al, "Tools for Collecting Speech Corpora via Mechanical-Turk," Proceedings of the NAACL HLT 2010 Workshop on Creating Speech and Language Data with Amazon's Mechanical Turk. Jun. 2010. pp. 184-187.

Lawson, et al., "Annotating Large Email Datasets for Named Entity Recognition with Mechanical Turk," Proceedings of the NAACL HLT 2010 Workshop on Creating Speech and Language Data with Amazon's Mechanical Turk. Jun. 2010. pp. 71-79.

Le, et al. "Document Image Collection Using Amazon's Mechanical Turk," Proceedings of the NAACL HLT 2010 Workshop on Creating Speech and Language Data with Amazon's Mechanical Turk. Jun. 2010. pp. 45-52.

Madnani, et al., "Measuring transitivity Using Untrained Annotators," Proceedings of the NAACL HLT 2010 Workshop on Creating Speech and Language Data with Amazon's Mechanical Turk. Jun. 2010. pp. 188-194.

Marge, et al., "Using the Amazon Mechanical Turk to Transcribe and Annotate Meeting Speech for Extractive Summarization," Proceedings of the NAACL HLT 2010 Workshop on Creating Speech and Language Data with Amazon's Mechanical Turk. Jun. 2010. pp. 99-107.

Mellebeek, et al., "Opinion Mining of Spanish Customer Comments with Non-Expert Annotations on Mechanical Turk," Proceedings of the NAACL HLT 2010 Workshop on Creating Speech and Language Data with Amazon's Mechanical Turk. Jun. 2010. pp. 114-121.

Munro, et al., "Crowdsourcing and language studies: the new generation of linguistic data," Proceedings of the NAACL HLT 2010 Workshop on Creating Speech and Language Data with Amazon's Mechanical Turk. Jun. 2010. pp. 122-130.

Negri, Matteo and Yashar Mehdad, "Creating a Bi-lingual Entailment Corpus through Translations with Mechanical Turk: $100 for a 10-day Rush," Proceedings of the NAACL HLT 2010 Workshop on Creating Speech and Language Data with Amazon's Mechanical Turk. Jun. 2010. pp. 212-216.

Novotney, Scott and Chris Callison-Burch, "Shared Task: Crowdsourced Accessibility Elicitation of Wikipedia Articles," Proceedings of the NAACL HLT 2010 Workshop on Creating Speech and Language Data with Amazon's Mechanical Turk. Jun. 2010. pp. 41-44.

Parent, Gabriel and Maxine Eskenzai, "Clustering dictionary definitions using Amazon Mechanical Turk," Proceedings of the NAACL HLT 2010 Workshop on Creating Speech and Language Data with Amazon's Mechanical Turk. Jun. 2010. pp. 21-29.

Rashtchian, et al., "Collecting Image Annotations Using Amazon's Mechanical Turk," Proceedings of the NAACL HLT 2010 Work-

(56) References Cited

OTHER PUBLICATIONS shop on Creating Speech and Language Data with Amazon's Mechanical Turk. Jun. 2010. pp. 139-147.

Wang, Rui and Chris-Callison-Burch, "Cheap Facts and Counter-Facts," Proceedings of the NAACL HLT 2010 Workshop on Creating Speech and Language Data with Amazon's Mechanical Turk. Jun. 2010. pp. 163-167.

"Workshop on Creating Speech and Language Data with Amazon's Mechanical Turk," Proceedings of the Workshop. Jun. 6, 2010. 14 pages.

Yano, Tae, et al, "Shedding (a Thousand Points of) Light on Biased Language," Proceedings of the NAACL HLT 2011 Vorkshop on Creating Speech and Language Data with Amazon's Mechanical Turk. Jun. 2010. pp. 152-158.

Yetisgen-Yildiz, et al., "Preliminary Experience with Amazon's Mechanical Turk for Annotating Medical Named Entities," Proceedings of the NAACL HLT 2010 Workshop on Creating Speech and Language Data with Amazon's Mechanical Turk. Jun. 2010. pp. 180-183.

Zaidan, Omar F., and Juri Ganitkevitch, "An Enriched MT Grammar for Under $100," Proceedings of the NAACL HLT 2010 Workshop on Creating Speech and Language Data with Amazon's Mechanical Turk. Jun. 2010. pp. 93-98.

Common Voice—Mozilla, Retrieved from the Internet at URL: https://voice.mozilla.org/en on Dec. 20, 2018. 6 pages.

\* cited by examiner

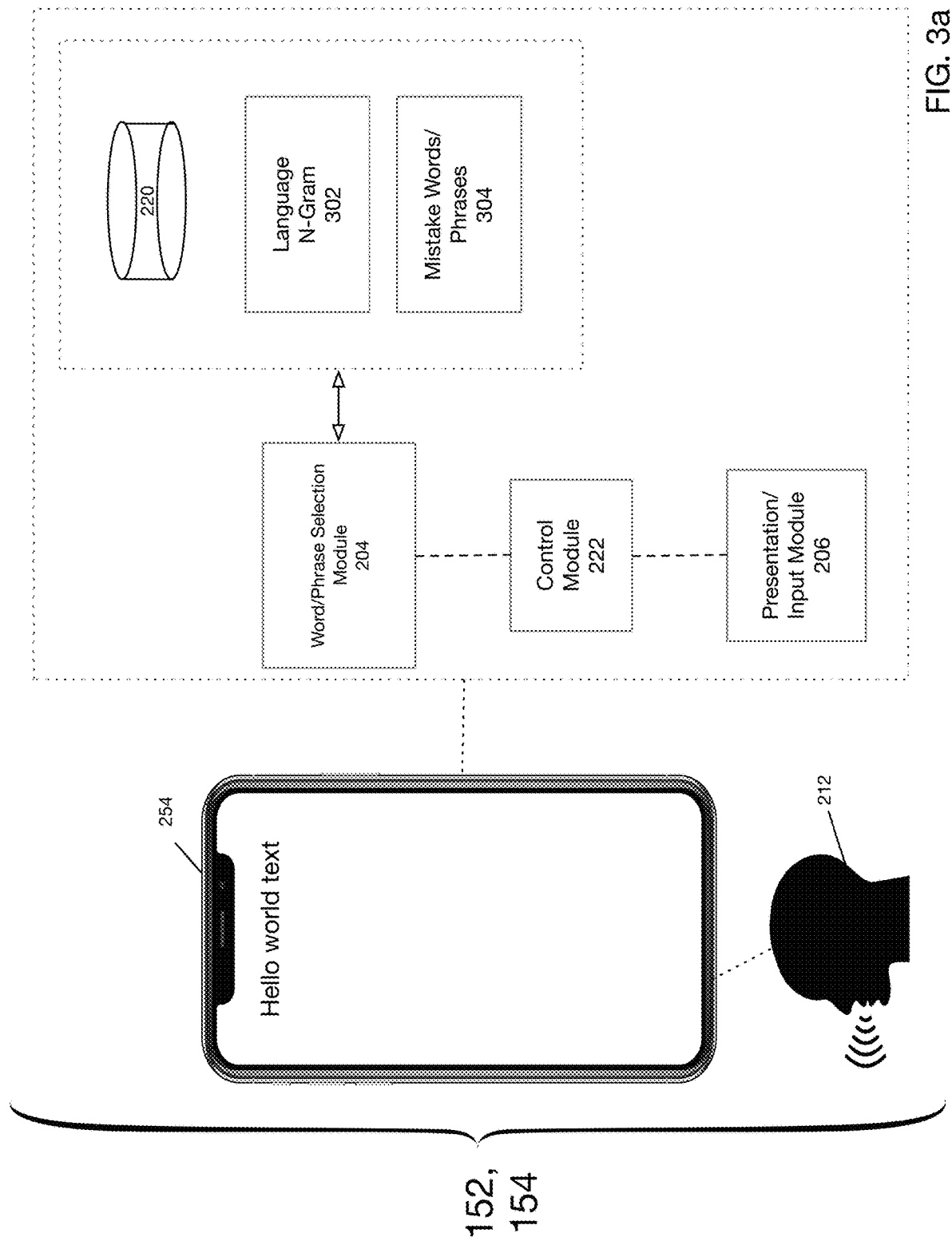

ACTIVE LEARNING FOR LARGE-SCALE SEMI-SUPERVISED CREATION OF SPEECH RECOGNITION TRAINING CORPORA BASED ON NUMBER OF TRANSCRIPTION MISTAKES AND NUMBER OF WORD OCCURRENCES

FIELD OF THE DISCLOSURE

This disclosure relates to techniques for performing automatic speech recognition (ASR). In particular, this disclosure relates to techniques for efficiently generating impactful ASR training data.

BACKGROUND

Training an automated speech recognition (ASR) engine requires a large training corpus containing speech files along with their transcriptions. As a rule of thumb, for open domain ASR, 10,000 hours of speech files is the bare minimum to generate even passable results and at best training on this small amount of data results in mediocre performance. Moving from 10,000 hours to 100,000 hours and beyond results in a significant difference in training time and ASR quality (i.e., the more time a given ASR engine spends learning, the more accurate the results provided by that ASR engine). However, currently the aggregate corpus of publicly available ASR training corpora is around 10,000 hours. Further, collecting ASR training corpora with traditional techniques is generally inefficient in terms of price, time and transcript quality. For instance, one possible technique for generating ASR training corpora generally employs a 3-step process as follows:

Step 1: user A types or otherwise writes a sentence.
Step 2: user B is shown user A's sentence and must pronounce it.
Step 3: user C verifies that user B correctly pronounced user A's sentence.

Step 1 is presumed to takes about 60% of the time needed (note that studies have shown that typing is about three times (or more) slower than speaking). Step 2 takes about 20% of the time, and step 3 takes about 20% of the time. This is not a particularly efficient use of a given worker's time or is otherwise time consuming. In addition to being time consuming, such techniques yield relatively low transcription accuracy, because the average typist makes about 8 typos for every 100 words typed.

Moreover, from a technological standpoint, there is a disconnect in the human-machine interface with respect to training an ASR engine, and that disconnect ultimately impairs the ability of the ASR engine to properly evolve or otherwise provide accurate results with a relatively high degree of consistency. For instance, the user (User A) has limited or no knowledge of what language a given ASR engine has already trained on. Thus, the user is more likely to provide training words or phrasing that are redundant or otherwise less helpful in advancing that ASR engine's state of knowledge. Likewise, rather than providing common words or phrasing, the user may unknowingly provide words and phrasing that are simply too rare or unused in the application in which the given ASR engine is to operate. Such less common words and phrases have a relatively low impact on improving the quality of the ASR engine. Furthermore, the user is likely unaware of words or phrasing that are more susceptible to transcription errors for the ASR engine, and therefore may fail to provide those words or phrasing. As such, the ASR engine may fail to evolve past those transcription errors.

Thus, new techniques for efficiently generating on-point or otherwise impactful ASR training data would be beneficial.

BRIEF DESCRIPTION OF THE DRAWINGS

FIG. 3a illustrates an operation of an ASR training system with respect a word phrase selection module according to one embodiment of the present disclosure.

DETAILED DESCRIPTION

Figure 1A:
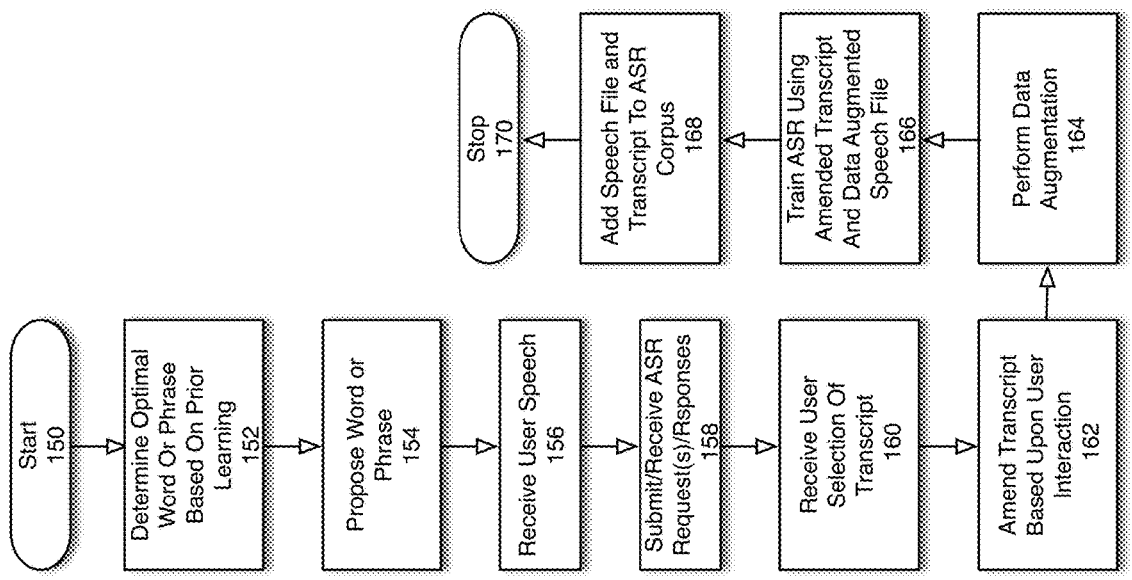
FIG. 1a is a high-level flowchart of a process for performing large-scale semi-supervised creation of speech recognition training corpora according to one embodiment of the present disclosure.

Techniques are disclosed for efficiently generating impactful training data for an automatic speech recognition (ASR) system. In particular, according to an embodiment, ASR training corpora can be generated much more efficiently, in terms of price, time, and transcript quality. The time for generation of ASR training corpora may be reduced, for instance, by as much as 50% compared with traditional approaches. In addition, the quality or relevance of ASR training corpora can be significantly increased, by leveraging knowledge of the ASR engine being trained during generation of the ASR training corpora. The techniques can be embodied, for instance, in a training section of an ASR system or a dedicated speech training system.

For instance, in one example case, a method for training an ASR system includes automatically selecting one of a word or phrase, and presenting a textual representation of that word or phrase to a user. The word or phrase is selected, for example, based on knowledge of the current training corpora database relevant to the ASR system being trained, which helps in avoiding redundant or otherwise less impactful training data. As will be appreciated, this is one feature that effectively bridges the human-machine disconnect noted above so as to significantly improve the ASR corpus as well as the accuracy of the ASR engine trained using the corpus. In addition, proposing to the user a word or a phrase has several other advantages including, for example: reducing the tendency for the user to read sentences from texts whose licenses do not allow for commercial use; assisting with creativity by reducing and possibly eliminating the writer's block effect; and improving the transcription accuracy of the ASR APIs because the given word or phrase can be passed to the ASR APIs and used as a hint (i.e., this word should be in the transcription). Further, for ASR APIs that don't accept such hints, the system can automatically eliminate or rank lower any received candidate transcriptions that do not contain the proposed word or phrase.

The methodology further includes receiving from the user a speech utterance that includes the word or phrase, and then providing the speech utterance to the ASR system being trained. The speech utterance can be submitted to any number of commercially or privately available transcription services, for example, by way of application programming interfaces (APIs) or local installation. Note that the ASR system being trained can be local or remote to the system generating the training data. Example transcription services include, for instance, Google Cloud Speech-to-Text API, Microsoft Bing Speech-to-Text API, and Adobe Kaldi-based ASR. The methodology further includes receiving one or more transcripts for the speech utterance from the ASR system, and presenting that one or more transcripts to a user (e.g., via display, aural presentation, or Braille). Note the transcription(s) and presentation to the user may be carried out in real-time or near real-time (real-time=the transcription is performed substantially at the same time as the user speaks). In some cases, such as with Adobe Kaldi-based ASR, the user may choose to view what has been transcribed so far as they speak. This allows the user to almost immediately obtain the transcription of their speech. As will be appreciated, "almost immediately" can vary somewhat but generally corresponds to the notion that a word is transcribed within a few hundreds of milliseconds after the user pronounces it. In any case, the presentation allows the user to check the accuracy of the various transcriptions. Advantageously, because the system knows the word or phrase that was suggested to the user, transcriptions that do not include the word or phrase can be eliminated or ranked lower, according to some such embodiments.

The methodology may further include, if necessary, receiving from the user an edit for a presented transcript, and amending the transcript based upon that edit. Allowing the user to edit the transcription contemporaneously with the utterance may allow for a more efficient and accurate review process, because the user is more dialed-in or otherwise focused on what he or she just uttered. In some such embodiments, the system can assist the user with the editing process. For instance, in one example case, the system is further programmed or otherwise configured to suggest corrective words or phrasing, which further helps bridge the human-machine disconnect noted above. So, for instance, consider the example case where a transcription presented to the user is "Ally Cat went to cool", but the utterance from the user was "Ally Cat went to school". According to one such embodiment, in response to the user clicking or tapping on the word "cool" in the presented transcript, the system provides a pop-up list of alternative word choices such as "school", "the pool", and "stool" that the user can select (with a click or tap). If the user selects "school" then the system amends the transcript to be "Ally Cat went to school".

The system may propose alternative words for the user selected word in a number of ways. For instance, in one example embodiment, for word X, the ASR APIs have proposed one or more alternative transcriptions, then those alternative transcriptions are added to the list of alternative words presented to the user. According to another embodiment, the system uses the n-gram distribution computed on the language of interest and selects the Y most likely words that could replace word X. In one such case, for instance, the system uses the Needleman-Wunsch algorithm to compute the lowest cost alignment between the sequence of phonemes corresponding to the word X and the sequence of phonemes corresponding to each of the Y most likely words. The system then selects the Z words with the lowest cost alignment to be presented as alternative words. As a result of such suggestions, the system significantly optimizes time the spent by the user on correcting the transcription, thereby yielding a higher transcription accuracy while lowering the cost.

The final transcript (now known to be accurate) and corresponding utterance can then be saved to a training data storage for subsequent use in training operations. According to some embodiments, and as will be further appreciated, a training operation can be performed on the ASR system using the amended transcript and the speech utterance, as well as numerous other such transcript-utterance pairs created using the various techniques provided herein. Numerous variations will be appreciated.

Note that the speech utterance can be captured and represented as an audio file (any digital or analog representation of a given utterance), and that the methodology may further include performing data augmentation on the speech audio file to generate one or more augmented audio files that correspond to the same transcript. So, for instance, in addition to sending the "original" or unadulterated version of the speech file to train the ASR system, the system performs data augmentation to slightly change the speech file to generate a second version of the original speech file having the same known correct transcript. The data augmentation can be carried out, for example, by adding noise and/or other effects such as reverb and style transfer to the speech file. Standard speech file editing techniques can be used to generate augmented speech file. As will be appreciated, providing such slightly modified versions of the original speech file along with the known-to-be-correct transcript allows for a more robust training session. In this sense, the modified speech files can be thought of as being derived from different people having different accents, inflections, and other manners of speech, which in turn will help the ASR machine being trained to better understand those various accents, inflections, or other variations on the same transcript.

In some such embodiments, the word or phrase provided by the system is generated, for instance, by one or more of: utilizing an already-determined ASR training corpus and selecting a word or phrase that is not represented (or is otherwise under-represented) in that corpus; employing a language N-Gram model; determining statistically probable mistakenly recognized words/phrases; and/or any other technique that can propose relevant words/phrases that would allow for meaningful training.

Architecture and Methodology

FIG. 1a is a high-level flowchart of a process for performing large-scale semi-supervised creation of speech recognition training corpora according to one embodiment of the present disclosure. The process is initiated in 150. In 152, an optimal word or phrase that a user will say is determined. According to one embodiment of the present disclosure, an optimal word or phrase may be determined based upon prior learning. Methods for determining an optimal word or phrase are described in more detail below. In 154, the word or phrase determined in 152 is presented to the user. In 156, an utterance is received from the user containing the word or phrase. In particular, the user is asked to devise a sentence using the word or phrase determined in 152. In 158, the utterance received in 156 is submitted to one or more ASR systems and transcripts for the submitted utterance are received. Submission to multiple ASR systems allows a user to select a best transcript. In particular, in 160, a user selection of a best transcript is received. In 162, the user is provided with an interface and input mechanism to modify the selected best transcription to generate an amended transcript (if necessary). In 164, data augmentation is performed on the speech utterance received in 156 to generate a modified or augmented speech utterance. According to one embodiment of the present disclosure, data augmentation may comprise adding noise to the speech utterance received in 156. However, other augmentation techniques are also possible as will be appreciated in light of this disclosure (e.g., changes in tone or pitch of the speaker's voice, elongation or compression of one or more syllables articulated by the speaker, softening of the "r" sound articulated by the speaker, or any other such modifications that might reflect the accent or dialect of a given geographic region or simply provide diversity in the sound of the given speakers). In 166, one or more ASRs are trained using the transcript (as amended, if any) generated in 162 and the original utterance received in 156 and/or augmented utterance generated in 164. This may be accomplished by calling an appropriate method on an ASR. In 168, the transcript (as amended) and original and any augmented utterances are stored in a data repository for later ASR training. The process ends in 170. As will be appreciated, note that not all transcripts will need to be amended. Further note that not all original utterances need to be augmented or modified. Indeed, in some embodiments, no editing of transcripts or augmentation of utterances are performed.

Figure 1B:
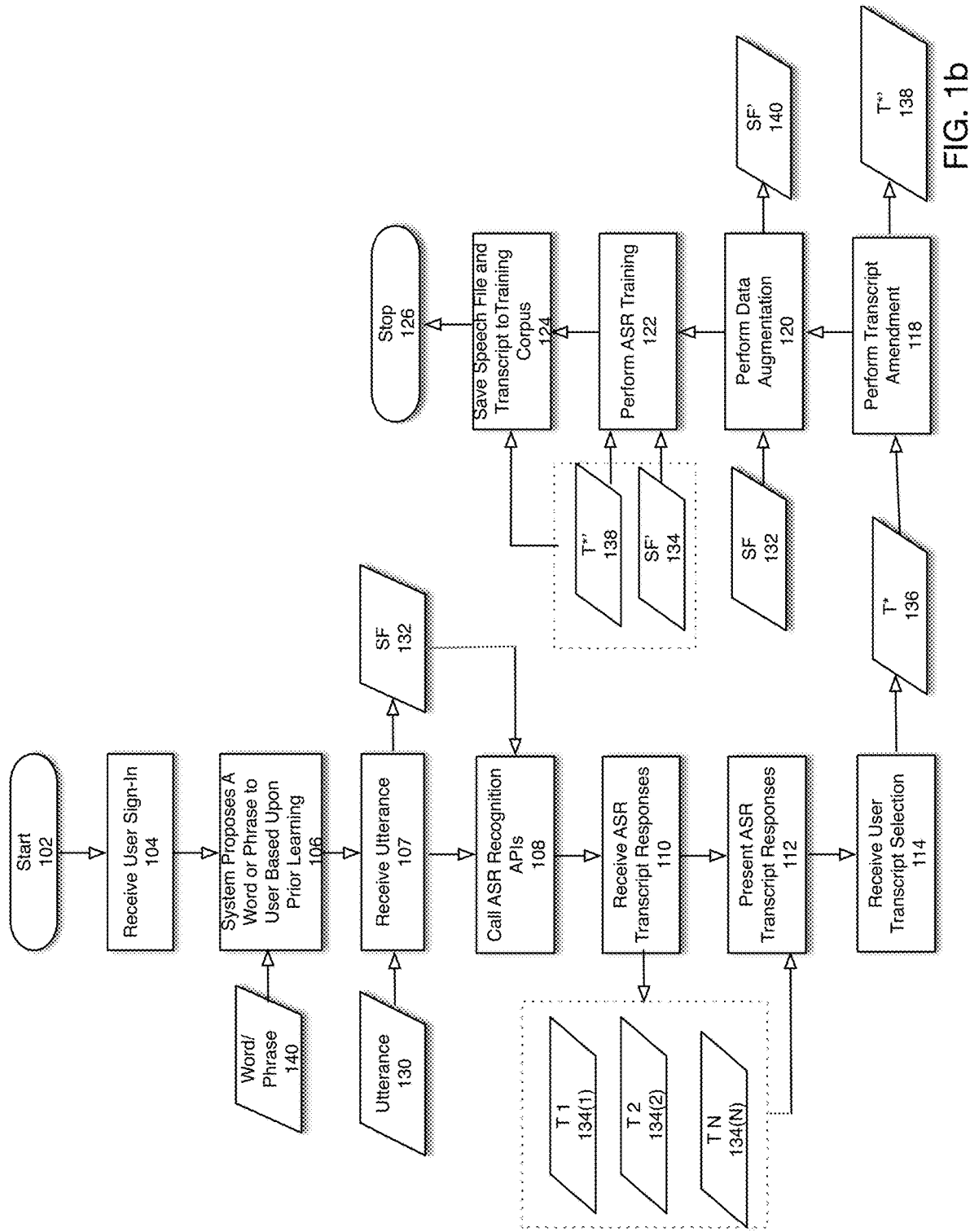
FIG. 1b is a detailed flowchart of a process for performing large-scale semi-supervised creation of speech recognition training corpora according to one embodiment of the present disclosure.

FIG. 1b is a detailed flowchart of a process for performing large-scale semi-supervised creation of speech recognition training corpora according to one embodiment of the present disclosure. The process shown in FIG. 1b shows a more detailed view of the high-level process shown in FIG. 1a and may be performed by an ASR training system, which is described in more detail in FIGS. 2a-2b. The process is initiated in 102. In 104, a user sign-in is received indicating that a user desires to utilize the system to perform ASR speech corpus gathering. In 106, the system proposes a word or phrase 140 for the user to say based upon prior learning. According to one embodiment of the present disclosure, a word/phrase database may store a plurality of words/phrases to be used for training purposes. In 107, an utterance (user speech) 130 is received based upon the proposed word/phrase 140. In particular, according to one embodiment of the present disclosure, the user is prompted to speak the word or phrase 140 proposed in 106. The utterance 130 is received by an audio capture system that converts an analog waveform to a digitally sampled audio file, herein referred to as a speech file (SF 132), for example, a WAV file.

In 108 one or more ASR methods for performing speech recognition are called using SF 132. In particular, according to one embodiment an ASR engine may provide an API comprising one or more methods for performing various functions. Among these methods, the API may provide a method for performing speech recognition using a speech file 132 to generate a transcription. Multiple ASRs may be called using the same SF 132 in order to increase the accuracy of the transcription by examining, for example, the predominance of a specific transcription among the multiple ASRs. In 110, ASR transcripts (T) 134(1)-134(N) are received based upon SF 132 transmitted in 108. In 112, the one or more transcripts 134(1)-134(N) are presented to the user in order that the user may perform a selection of the best (most accurate transcript). In 114, a user selection of the most accurate transcript is received identifying a selected transcript T* 136.

In 118, an amendment of transcript T* 136 is performed (if necessary, which is assumed to be the case here for purposes of providing a robust disclosure; in other example embodiments amending the transcript T* 136 is not needed). In particular, according to one embodiment of the present disclosure, the user may be asked to amend the selected transcript T* 136 to generate an amended selected T*' 138. In 120, data augmentation is performed on SF 132. In particular, according to one embodiment of the present disclosure, the data augmentation may be performed by introducing noise or other artifacts to SF 132 in order to generate augmented SF' 140. In 122, ASR training is performed using T*' 138 and SF' 140. In particular, according to one embodiment of the present disclosure, each ASR may provide one or more methods for performing ASR training by receiving a speech file and transcript. Thus, in 122, these methods may be called utilizing T*' 138 and SF' 140. In 124, SF' 140 and T*' 138 are stored in a training corpus. The process ends in 126.

Figure 2A:
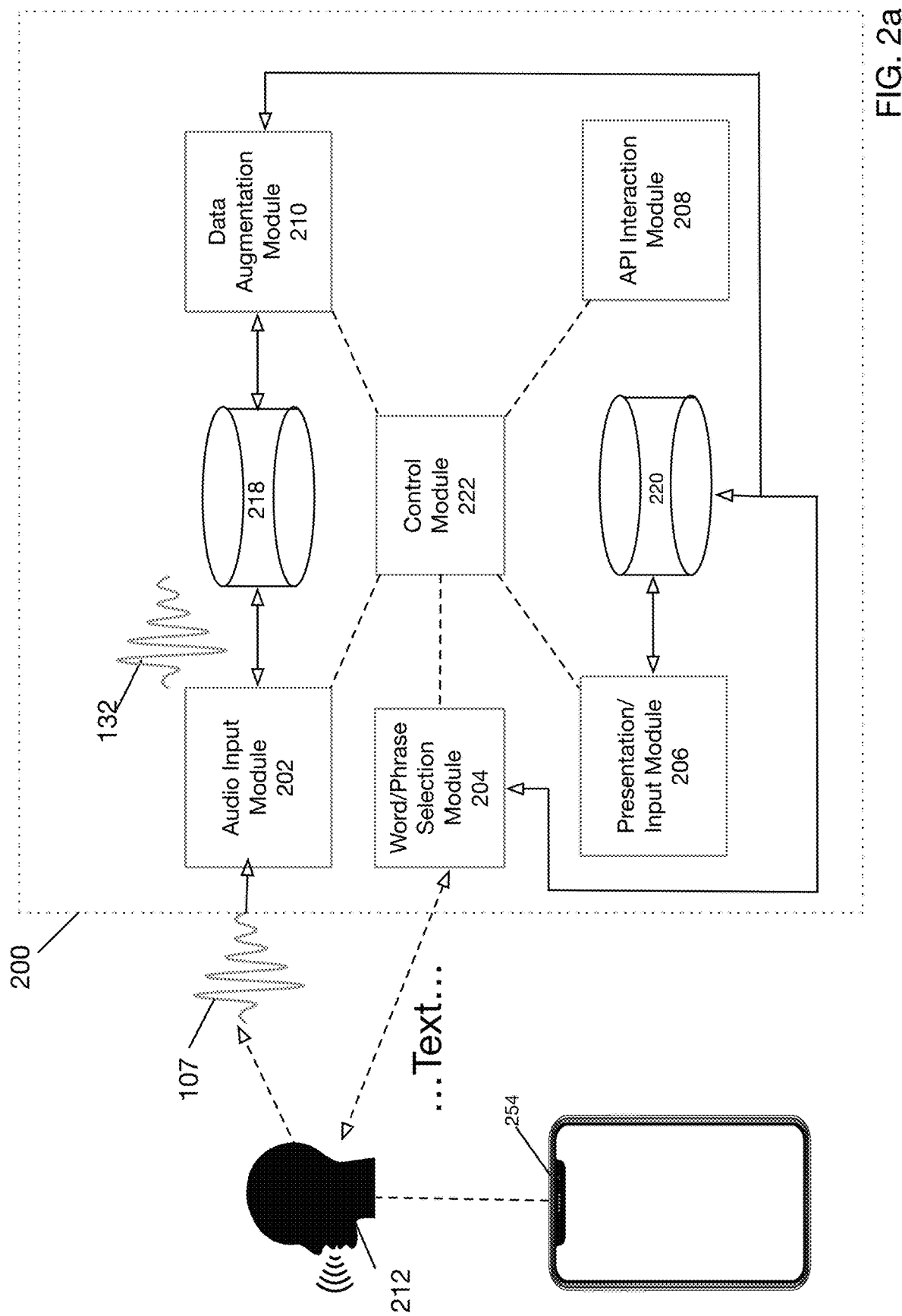
FIG. 2a is a block diagram of an ASR training system for performing large-scale semi-supervised creation of speech recognition training corpora according to one embodiment of the present disclosure.

FIG. 2a is a block diagram of an ASR training system for performing large-scale semi-supervised creation of speech recognition training corpora according to one embodiment of the present disclosure. As shown in FIG. 2a, ASR training system 200 comprises audio input module 202, word/phrase selection module 204, control module 222, data augmentation module 210 and API interaction module 208. ASR training system 200 further comprises ASR corpus 220 and speech database 218. Control module 222 operates to orchestrate the control of the various modules such as input module 202, word/phrase selection module 204, data augmentation module 210 and API interaction module 208. It will be recognized that logical breakdown of the various modules and databases shown in FIG. 2a are examples only and according to alternative embodiments, the various modules may be combined in various permutations or logical combinations. Furthermore, in some embodiments, various modules may be omitted or additional modules may be incorporated.

The operation of ASR training system 200 will now be described. As shown in FIG. 2a, user 212 utilizes computing device 254 to interact with ASR training system 200. Computing device 254 may be a smartphone, tablet, desktop computer or any other device with computational and display capabilities.

The functional operation of the various modules will now be described. During an ASR training session, control module 222 may cause the synchronization and control of word/phrase selection module 204, audio input module 202, presentation input module 206, data augmentation module 210 and API interaction module 208. Word/phrase selection module 204 operates to generate a word or phrase to be spoken by user 212. According to one embodiment of the present disclosure, word/phrase selection module may generate a word/phrase by using input from ASR corpus 220, using a language N-Gram model, by determining statistically probable mistakenly recognized words/phrases or any other technique.

Audio input module 202 operates to receive utterance 107 from user 212, which is converted to a speech file 132 and stored the audio in speech file database 218. Speech file 132 may comprise a digitally sampled speech audio waveform. According to some embodiments, speech file 132 may be generated from an analog speech waveform received by computing device 254, which operates to digitize the analog waveform comprising utterance 107 to generate speech file 132.

Presentation input module 206 operates to generate a user interface for display of text and other information to user 212 via computing device 254. For example, presentation/input module 206 may receive text generated by word/phrase selection module 204 and generate a suitable user interface for display of the text on computing device 254 to user 212. Presentation/input module 206 may also operate to receive input from user 212 via computing device 254 regarding user selection and other user interaction.

Data augmentation module 210 operates to retrieve digital audio data from speech database 218 and perform a data augmentation process. Data augmentation may comprise any modification of digital speech data. For example, according to one embodiment of the present disclosure, data augmentation module 210 may inject random noise into a speech file 132 to generate modified speech audio. The modified speech file can be saved along with the original speech file 132 and the corresponding transcript, thereby providing first and second training pairs (with a training pair including a speech file and a known-to-be-correct transcript of that speech file).

API interaction module 208 operates to perform API requests for one or more ASR APIs for either training or receiving recognition requests. As will be described below with respect to FIG. 2b, ASR training system 200 may interact with one or more ASR APIs, which may be internal or externally accessible (e.g., via a network) from ASR training system 200.

ASR corpus 220 stores ASR training data that may comprise both speech file 132 and associated recognition results. According to one embodiment of the present disclosure, and as discussed in more detail below, word/phrase selection module 204 and data augmentation module 210 may interact with ASR corpus 220 to store an augmented speech file 140 and an associated transcription of the underlying augmented speech file.

Figure 2B:
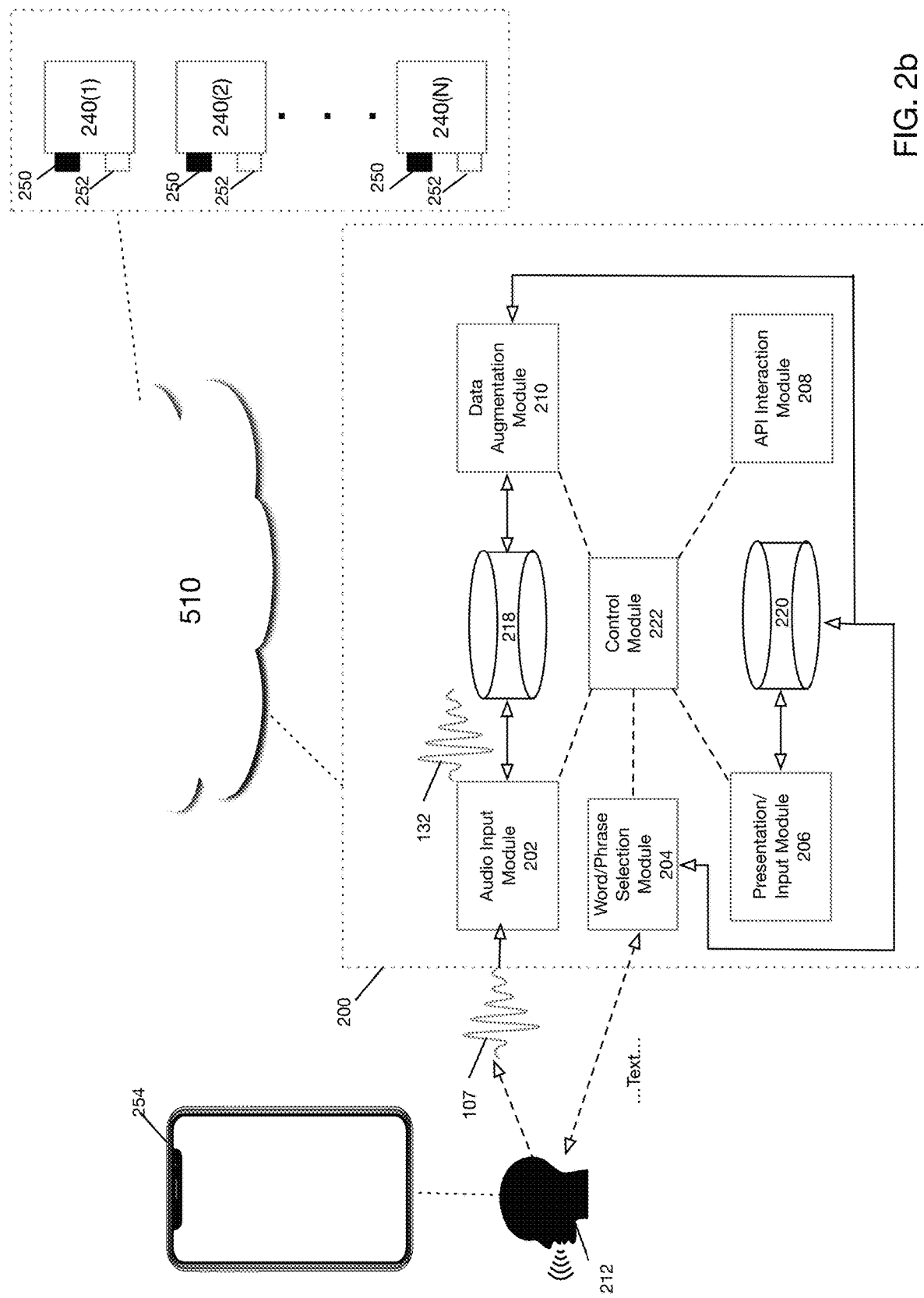
FIG. 2b is a block diagram illustrating an interaction of an ASR training system with one or more ASRs according to one embodiment of the present disclosure.

FIG. 2b is a block diagram illustrating an interaction of an ASR training system with one or more ASRs according to one embodiment of the present disclosure. User 212 utilizes computing device 254 to interact with ASR training system 200 in order to train ASRs 240(1)-240(N). As shown in FIG. 2b, each ASR 240 provides a respective recognition API 250 and a respective training API 252. Recognition API 250 provides one or more methods for receiving a recognition result in response to a speech audio signal. Training API 252 provides one or more methods for training a respective ASR 240 by receiving speech file 132 and an associated transcript 134 for performing training of an ASR 240. As shown in FIG. 2b, ASRs 240(1)-240(N) are accessed remotely from ASR training system 200 via network 510. However, according to alternative embodiments, ASRs 240(1)-240(N) may be integrated with ASR training system 200.

Figure 3B:
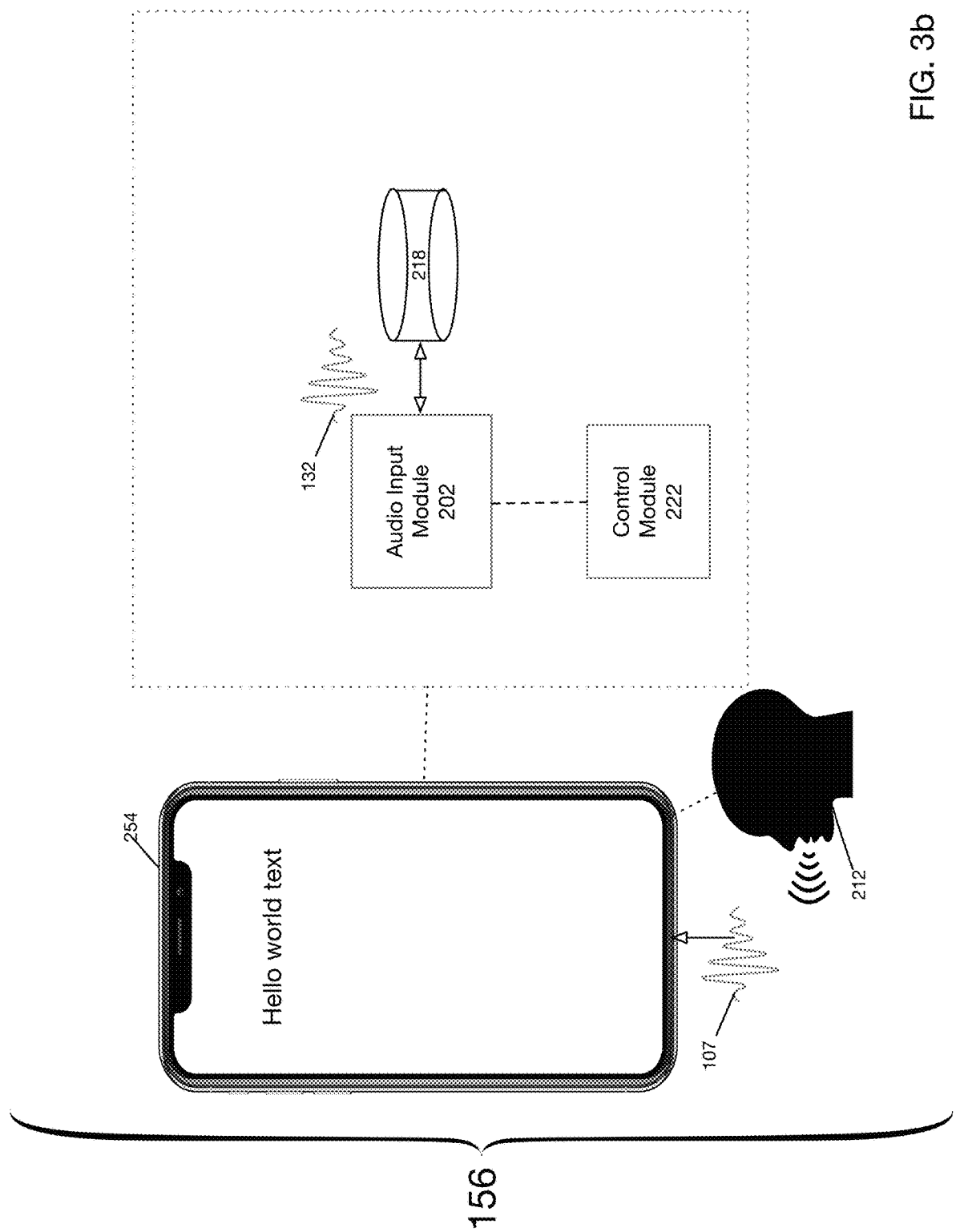
FIG. 3b illustrates an operation of an ASR training system with respect to an audio input module according to one embodiment of the present disclosure.

FIGS. 3a-3f illustrate various operations of an ASR training system according to one embodiment of the present disclosure. FIG. 3a illustrates an operation of a word phrase selection module according to one embodiment of the present disclosure. In particular, FIG. 3a illustrates the operation of an ASR training system with respect to 152, 154 in FIG. 1a. As shown in FIG. 3a, word/phrase selection module 204 upon receiving an appropriate signal from control module 222 operates to select a word or phrase to present to user 212 via computing device 254. According to one embodiment of the present disclosure, a word/phrase may be selected by utilizing ASR corpus 220 collected so far. For example, if ASR corpus 220 contains 10 speech files with the words "hello" but no speech file with the word "world", then collecting a speech file with the word "world" is more useful than collecting a speech file with the word "hello". Thus, words and/or phrases that are missing or otherwise under-represented in the ASR corpus 220 can be selected for presentation to user. Under-represented as used herein may be defined, for instance, by using an established target threshold of occurrences. For example, if the target occurrence threshold for a word or phrase in the ASR corpus 220 is twenty or more occurrences, then any word or phrase having an occurrence of less than twenty may be thought of as missing or otherwise under-represented. Such under-represented words/phrases can be selected by the system for presentation to the user until their respective occurrence rate in the ASR corpus 220 meets the given threshold. As will be further appreciated, the target occurrence threshold can vary from one embodiment to the next, depending on factors such as difficulty of the language in question (i.e., difficulty for an ASR engine to recognize that language) and/or the desired quality level and accuracy of the ASR engines being trained with the ASR corpus 220.

According to an alternative embodiment, word/phrase selection module 204 may utilize an N-gram distribution on the language technique, as represented by reference numeral 302 in FIG. 3a. In particular, it is more important for ASR corpus 220 to contain many occurrences of a common words or phrase/N-gram than to contain many occurrences of a rare words or phrase/n-gram.

According to yet another embodiment, word/phrase selection module 204 may utilize the words and phrases where the current ASR 240 makes the most transcription mistakes, as represented by reference numeral 304 in FIG. 3a. In particular, this method may be employed when ASR transcription accuracy is most important.

FIG. 3b illustrates an operation of an ASR training system with respect to an audio input module according to one embodiment of the present disclosure. In particular, FIG. 3b illustrates an operation of an ASR training system with respect to 156 in FIG. 1a. As shown in FIG. 3b, audio input module 202 upon receiving an appropriate control signal from control module 222, operates to receive speech file 132 via computing device 254 and store speech file 132 in speech file database 218. In particular, user 212 may generate a speech utterance 107 in response to the displayed word/phrase displayed in FIG. 3a.

Figure 3C:
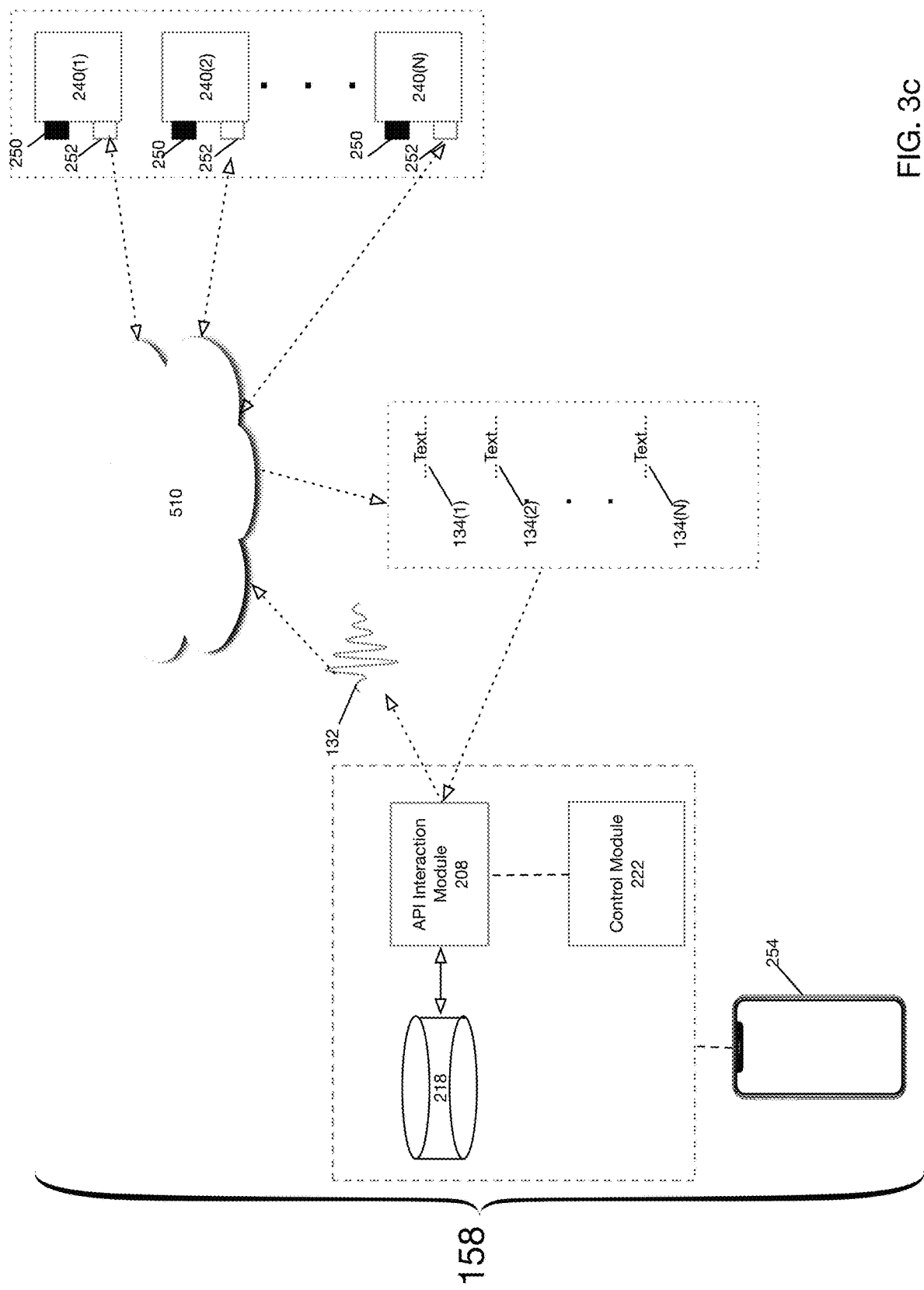
FIG. 3c illustrates an operation of an ASR training system with respect to an API interaction module according to one embodiment of the present disclosure.

FIG. 3c illustrates an operation of an ASR training system with respect to an API interaction module according to one embodiment of the present disclosure. In particular, FIG. 3c illustrates the operation of an ASR training system with respect to 158 in FIG. 1a. As shown in FIG. 3c API interaction module 208 performs the submission of speech file 132 to one or more ASRs 240(1)-240(N) and receipt of respective transcripts 134(1)-134(N) from those ASRs 240(1)-240(N). Upon receipt of an appropriate control signal from control module 222, API interaction module 208 operates to retrieve speech file 132 from speech file database 218 and submit speech file 132 to one or more ASRs 240(1)-240(N) via network 510. As previously noted, according to alternative embodiments, ASRs 240(1)-240(N) may be co-located with ASR training system 200.

Figure 3D:
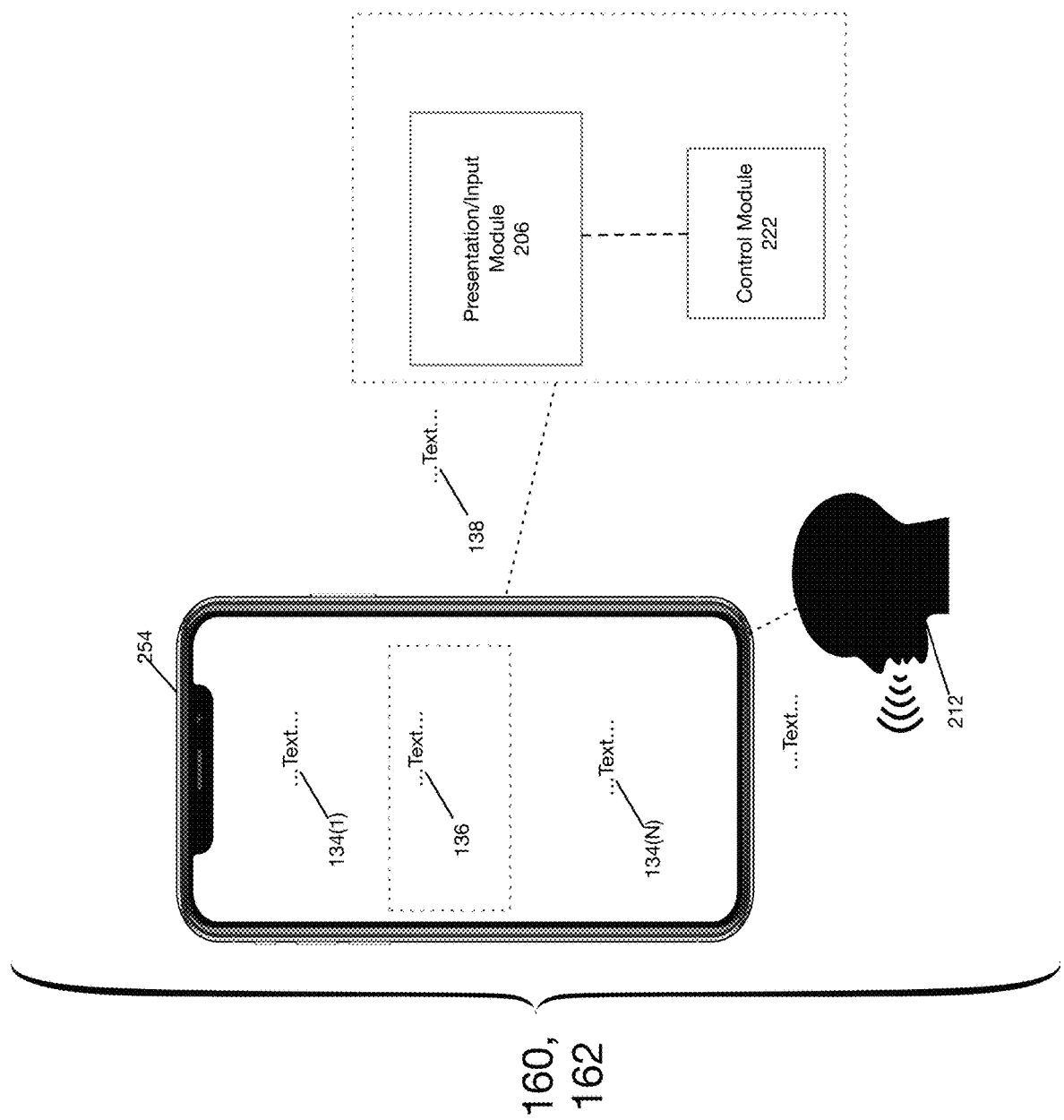
FIG. 3d illustrates an operation of an ASR training system with respect to a presentation/input module according to one embodiment of the present disclosure.

FIG. 3d illustrates an operation of an ASR training system with respect to a presentation/input module according to one embodiment of the present disclosure. In particular, FIG. 3d illustrates an operation of an ASR training system with respect to 160, 162 in FIG. 1a. As shown in FIG. 3d, presentation/input module 206 presents several candidate transcripts 134(1)-134(N) to user 212. As shown in FIG. 3d, user 212 may use computing device 254 to select a particular transcription indicated by the dotted box such that selected transcript 136 is determined based upon user's 212 input. User 212 may then be prompted to amend the selected transcript 136 to match the word/phrase pronounced earlier, thereby generating amended selected transcript 138.

In this instance, presentation/input module 206 may operate to display possible alternative words to user 212 as well as receive user input regarding amendments to selected transcript 136. To assist user 212 in amending the selected transcript 136 if necessary, ASR training system 200 via presentation/input module 206 proposes alternative words for each word in the transcription. User 212 may access alternative words for a given word of the transcript by simply clicking on them. For example, if the transcript that user 212 chooses to edit is "Bob had a long day as he went to walk early in the morning." whereas user 212 had said "work", not "walk", user 212 may click on "walk" and ASR training system 200 may propose a list of alternative words, which ideally contains "work".

According to one embodiment of the present disclosure, to propose alternative words for word X, ASR training system 200 may employ several strategies. According to a first embodiment of the present disclosure, if for word X, the ASR APIs 252 have proposed one or several alternative transcripts 134, these alternatives are added to the list of alternative words.

According to a second embodiment of the present disclosure, using an N-gram distribution computed on the language of interest, ASR training system 200 selects the Y most likely words (by default Y=10,000) that could replace word X. Then, for example, employing the Needleman-Wunsch algorithm, ASR training system 200 computes the lowest cost alignment between the sequence of phonemes corresponding to the word X and the sequence of phonemes corresponding to each of the Y most likely words (if Y=10,000, it takes a few hundred seconds and one CPU core to compute all the lowest cost alignments, so time complexity isn't an issue). ASR training system 200 then selects the Z words with the lowest cost alignment to be presented as alternative words. As a result, ASR training system 200 significantly optimizes time the spent by the user on correcting the transcription, thereby yielding a higher transcription accuracy while lowering the cost.

Figure 3E:
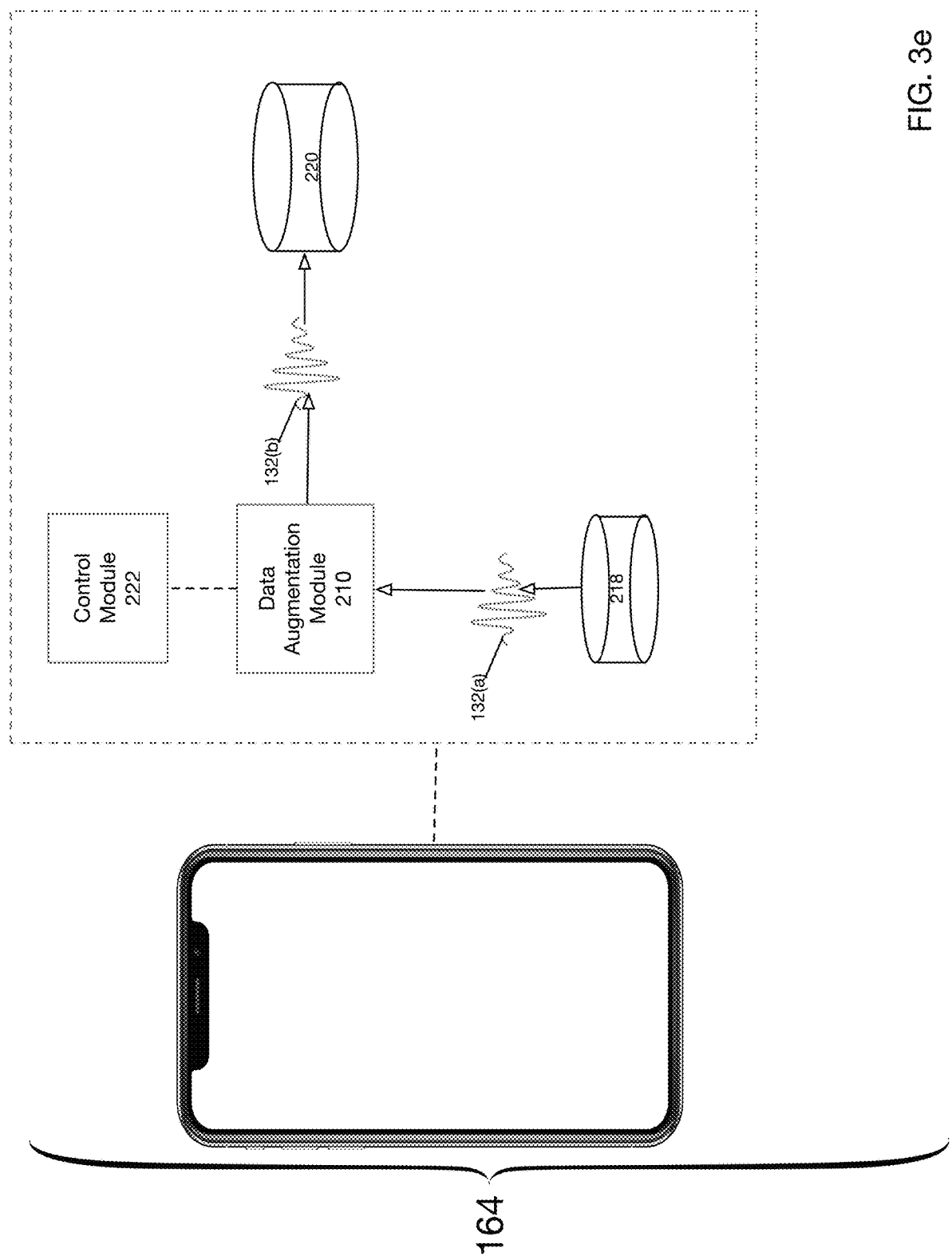
FIG. 3e illustrates an operation of an ASR training system with respect to a data augmentation module according to one embodiment of the present disclosure.

FIG. 3e illustrates an operation of an ASR training system with respect to a data augmentation module according to one embodiment of the present disclosure. In particular, FIG. 3e illustrates an operation of an ASR training system with respect to 164 in FIG. 1a. As shown in FIG. 3e, upon receipt of an appropriate control message from control module 222, data augmentation module 210 operates to retrieve speech file 132(a) from speech audio database 218 and performs data augmentation on speech file 132(a) to generate modified speech file 132(b). According to one embodiment of the present disclosure, data augmentation module 210 modifies speech file 132(a) by adding synthetic noise to speech audio 132(a) to generate augmented/modified speech audio 132(b). However, according to other embodiments, data augmentation module 210 may perform other signal processing functions to bring about any number of modifications to the speech file.

Figure 3F:
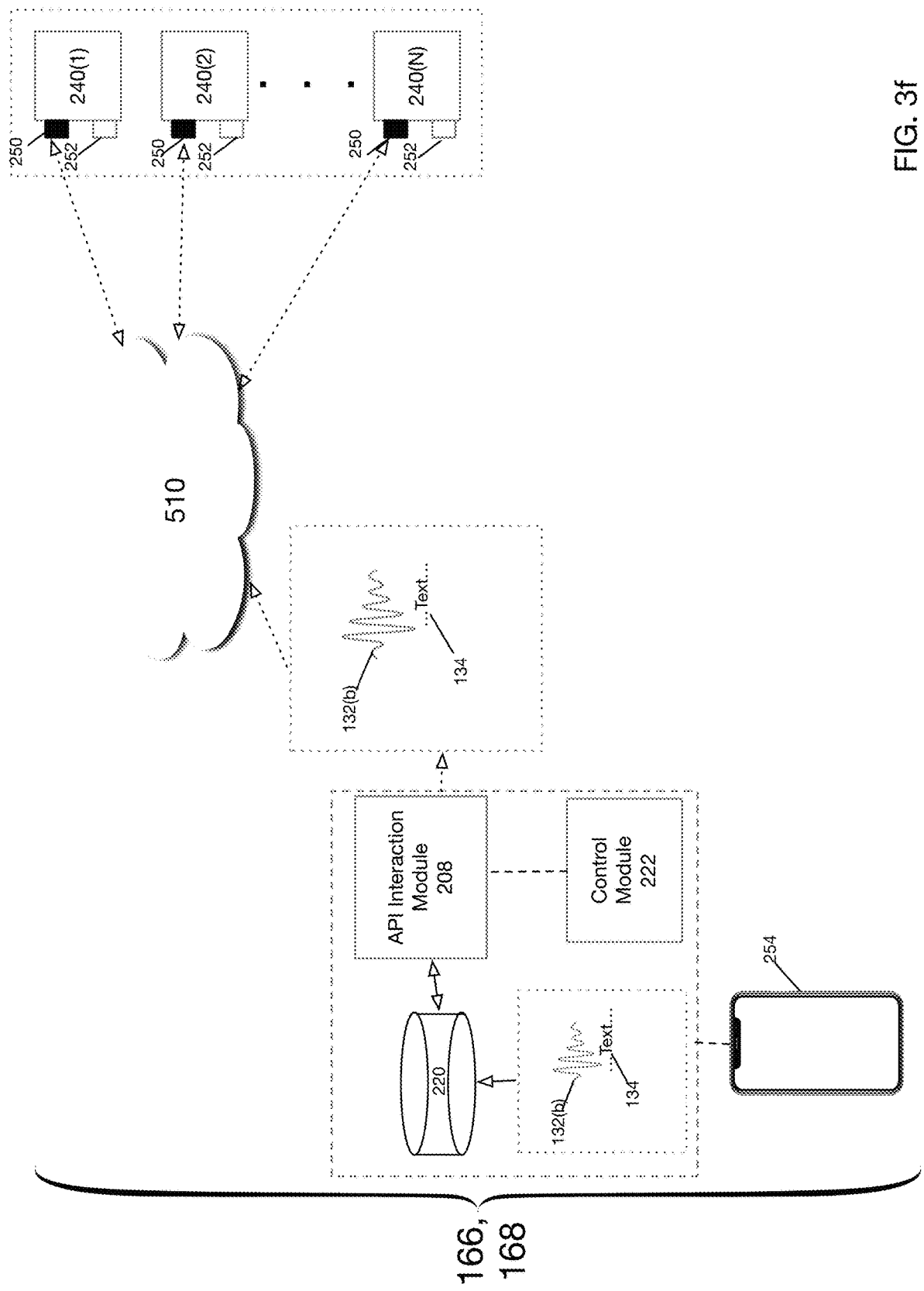
FIG. 3f illustrates an operation of an ASR training system with respect to an API interaction module according to one embodiment of the present disclosure.

FIG. 3f illustrates an operation of an ASR training system with respect to an API interaction module according to one embodiment of the present disclosure. In particular, FIG. 3f illustrates an operation of an ASR training system with respect to 166, 168 in FIG. 1a. As shown in FIG. 3f, upon receipt of an appropriate control signal from control module 222, API interaction module may transmit transcript 134 or amended selected transcript 138 and data augmented speech audio 132(b) to ASRs 240(1)-240(N) by calling respective training method 252. Thus, ASRs 240(1)-240(N) are trained using the augmented speech file 132(b) and modified selected transcript 138. Further, as shown in FIG. 3f, transcript 134 or amended selected transcript 138 and modified speech file 132(b) are stored in ASR corpus 220 for later use and training. Note the original speech file may also be so stored, so as to provide multiple training pairs each associated with the same transcript, as previously explained.

Integration in Computing System and Network Environment

Figure 4A:
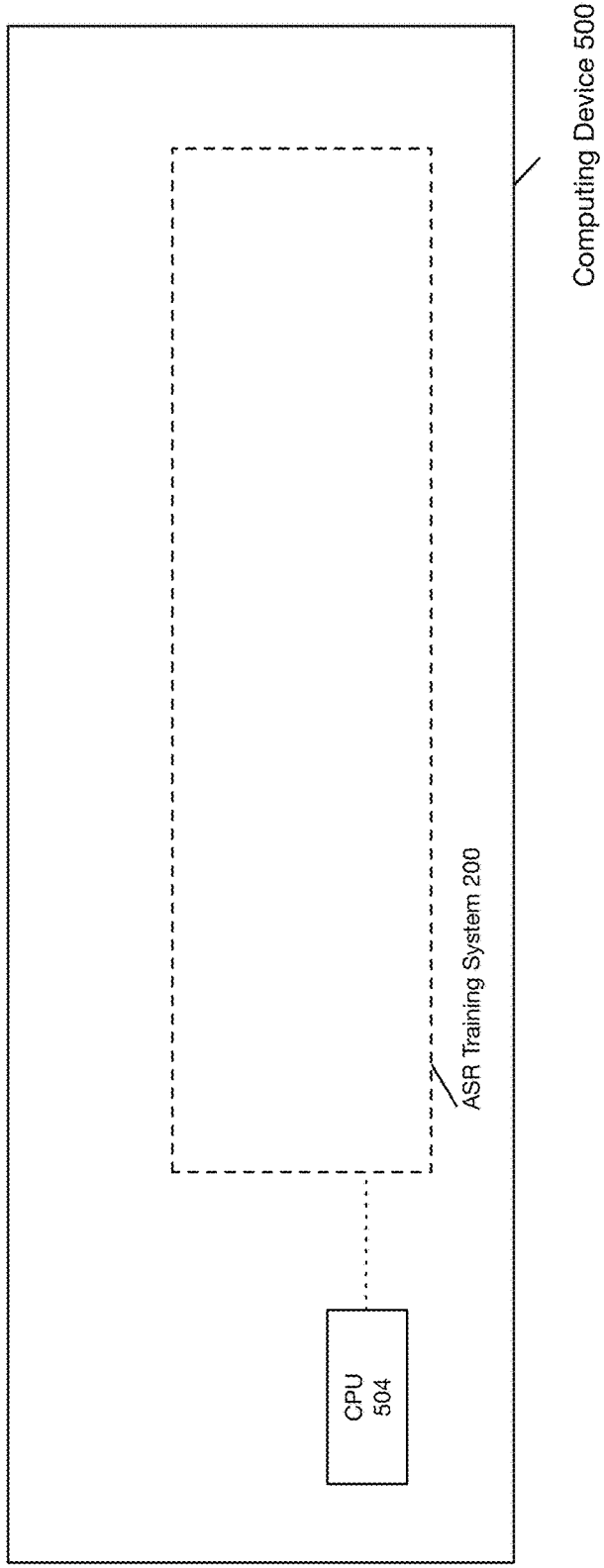
FIG. 4a illustrates an example computing system that executes an ASR training system according to one embodiment of the present disclosure.

FIG. 4a illustrates an example computing system that executes an ASR training system 200 according to one embodiment of the present disclosure. As depicted in FIG. 4a, computing device 500 may include central processing unit (CPU) 504 that executes one or more processes to perform ASR training system 200. In particular, CPU 504 may be further configured via programmatic instructions to execute ASR training system 200 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform. According to alternative embodiments CPU 504 may be replaced with a (graphics processing unit) GPU, or used in conjunction with a GPU.

Figure 4B:
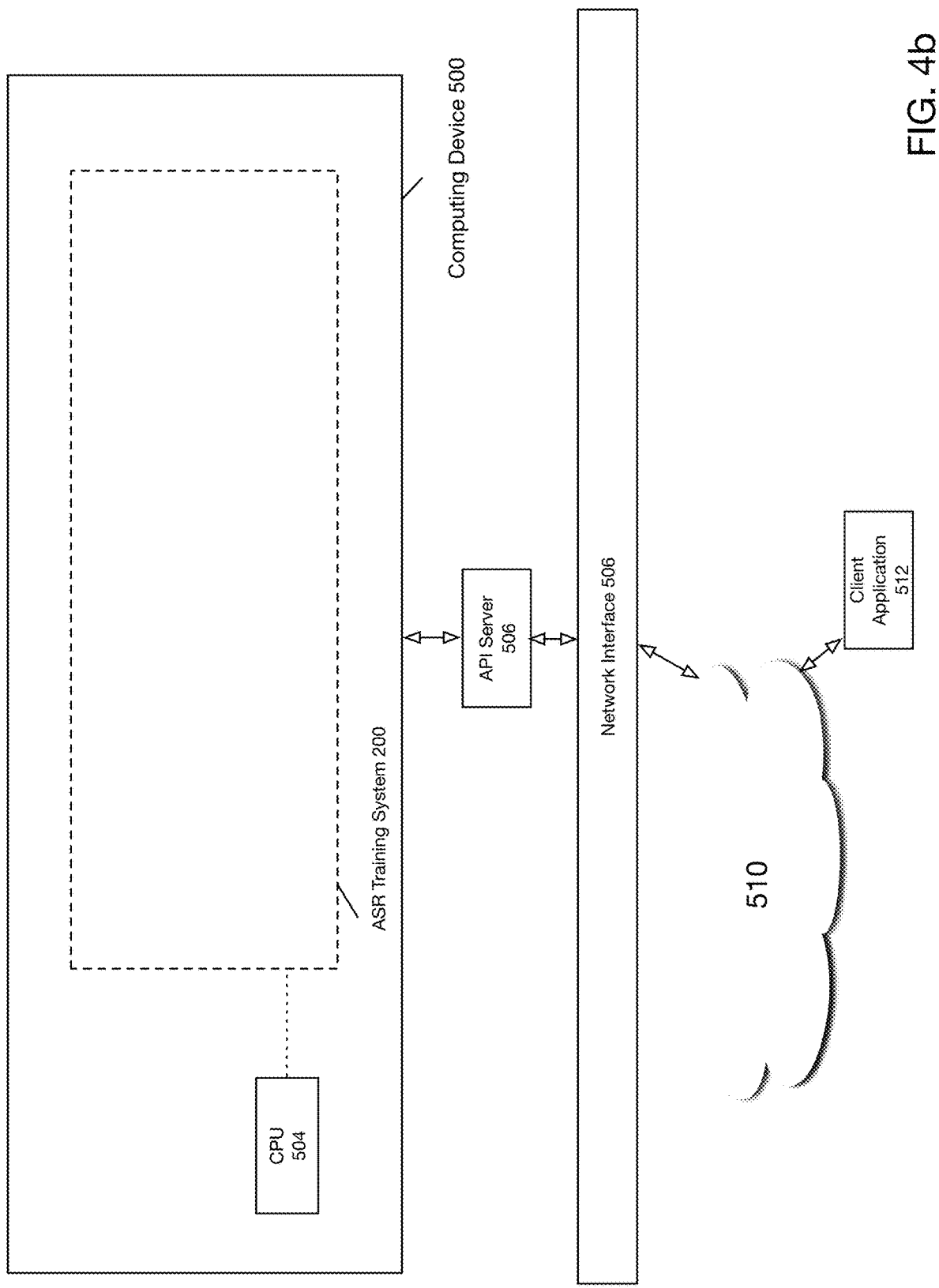
FIG. 4b illustrates an example integration of an ASR training system into a network environment according to one embodiment of the present disclosure.

FIG. 4b illustrates an example integration of an ASR training system 200 into a network environment according to one embodiment of the present disclosure. As depicted in FIG. 4b, computing device 500 may be collocated in a cloud environment, data center, local area network (LAN) etc. Computing device 500 shown in FIG. 4b is structured identically to the example embodiment described with respect to FIG. 4a. As shown in FIG. 4b, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any typical personal computing platform As will be further appreciated, computing device 500, whether the one shown in FIG. 4a or 4b, includes and/or otherwise has access to one or more non-transitory computer-readable media or storage devices having encoded thereon computer-executable instructions or software for implementing techniques as variously described herein. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible, as will be appreciated.

In some example embodiments of the present disclosure, the various functional modules described herein may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various methodologies provided herein to be carried out. In still other embodiments, the functional modules provided herein are implemented using software-based engines. In such embodiments, an engine is a functional unit or system including one or more processors programmed or otherwise configured with instructions encoding a process as variously provided herein. In this way, a software-based engine is a functional circuit.

In still other embodiments, the functional modules provided herein are implemented with hardware circuits, such as gate level logic (FPGA) or a purpose-built semiconductor (e.g., application specific integrated circuit, or ASIC). In still other embodiments the functional modules are implemented with a microcontroller having a processor, a number of input/output ports for receiving and outputting data, and a number of embedded routines executable by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with one or more software modules, or a logic-based hardware circuit that provides a set of outputs in response to a certain set of inputs. Numerous configurations will be apparent.

Further Example Embodiments

The following examples pertain to further embodiments, from which numerous permutations and configurations will be apparent.

Example 1 is a method for generating training data for an automatic speech recognition (ASR) system, said method comprising: selecting one of a word or phrase; presenting a textual representation of said word or phrase; receiving a speech utterance that includes said word or phrase; providing said speech utterance to an ASR system, wherein said speech utterance is represented as an audio file; receiving a transcript for said speech utterance from said ASR system; presenting said transcript for review; and storing said transcript and said audio file in an ASR system training database. In some such cases, the selecting comprises one or more of selecting one of a word or a phrase that is under-represented in said ASR system training database according to a first predetermined threshold, selecting one of a word or a phrase based upon an n-gram distribution on a language, and selecting one of a word or a phrase based upon determination of words or phrases for which the ASR system makes a number of transcription mistakes exceeding a second predetermined threshold.

Example 2 includes the subject matter of Example 1, and further includes receiving amendment information for said transcript and amending said transcript based upon said amendment information; and storing said amended transcript and said audio file in said ASR system training database.

Example 3 includes the subject matter of Example 1 or 2, and further includes performing data augmentation on said audio file to generate an augmented audio file; and storing said transcript and said augmented audio file in said ASR system training database.

Example 4 includes the subject matter of any of the previous Examples, wherein presenting said transcript comprises presenting suggested alternative words for use in editing said transcript. In some such cases, the suggested words are: selected from one or more alternative transcriptions; and/or based on an n-gram distribution computed on language of interest included in said transcript.

Example 5 includes the subject matter of any of the previous Examples, wherein selecting one of a word or phrase comprises two or more of: selecting one of a word or a phrase that is under-represented in said ASR system training database according to a first predetermined threshold; selecting one of a word or a phrase based upon an n-gram distribution on a language; and selecting one of a word or a phrase based upon determination of words or phrases for which the ASR system makes a number of transcription mistakes exceeding a second predetermined threshold.

Example 6 includes the subject matter of any of the previous Examples, wherein selecting one of a word or a phrase based upon an n-gram distribution comprises applying a Needleman-Wunsch algorithm, the method further comprising computing a lowest cost alignment between a sequence of phonemes corresponding to a word in a sequence of phonemes corresponding to each of a set of most likely words and selecting at least one word with a lowest cost alignment to be presented as alternative words.

Example 7 includes the subject matter of any of the previous Examples, and further includes one or more of: performing a training operation on said ASR system based upon said transcript and said audio file; performing a training operation on said ASR system based upon an amended version of said transcript and said audio file; performing a training operation on said ASR system based upon said transcript and an augmented version of said audio file; and performing a training operation on said ASR system based upon an amended version of said transcript and an augmented version of said audio file.

Example 8 is a system for generating training data for an automatic speech recognition (ASR) system, said system comprising: a selection circuit to select one of a word or a phrase; an audio input circuit to receive a speech utterance in response to a textual representation of said one word or phrase, and store said speech utterance as an audio file; an API interaction circuit to interact with an ASR application programming interface (API) so as to retrieve a transcript of the audio file; a text input circuit to receive user input including amendments to said transcript to correct perceived inaccuracies; a data augmentation circuit to process said audio file thereby generating a modified audio file; and an ASR database to store an association between said transcript and one or both of said audio file and said modified audio file. Recall the ASR database may be local (e.g., local hard-drive of system) or remote (e.g., network or cloud-based storage). Further recall that the system may be part of a system to be trained, or separate and distinct from the system to be trained.

Example 9 includes the subject matter of Example 8, wherein said selection circuit selects one of a word or a phrase by one or more of: selecting one of a word or a phrase that is under-represented in said ASR database according to a first predetermined threshold; selecting one of a word or a phrase based upon an n-gram distribution on a language; and selecting one of a word or a phrase based upon determination of words or phrases for which the ASR system makes a number of transcription mistakes exceeding a second predetermined threshold.

Example 10 includes the subject matter of Example 9, wherein selecting one of a word or a phrase based upon an n-gram distribution comprises applying a Needleman-Wunsch algorithm, and wherein said text input circuit is further to receive amendment information, said amendment information being applied to said transcript to generate a modified transcript.

Example 11 includes the subject matter of Example 8 or 9, wherein said API interaction circuit is further used to one or more of: perform a training operation on said ASR system based upon said transcript and said audio file; perform a training operation on said ASR system based upon an amended version of said transcript and said audio file; perform a training operation on said ASR system based upon said transcript and an augmented version of said audio file; and perform a training operation on said ASR system based upon an amended version of said transcript and an augmented version of said audio file.

Example 12 includes the subject matter of any of Examples 8 through 11, wherein said ASR API comprises an automatic speech recognition method and an ASR system training method.

Example 13 is a computer program product including one or more non-transitory machine-readable mediums encoded with instructions that when executed by one or more processors cause a process to be carried out for generating training data for an ASR system, said process comprising: selecting one of a word or phrase; presenting a textual representation of said word or phrase; receiving a speech utterance that includes said word or phrase; providing said speech utterance to an ASR system, wherein said speech utterance is represented as an audio file; receiving a transcript for said speech utterance from said ASR system; presenting said transcript for review; and storing said transcript and said audio file in an ASR system training database.

Example 14 includes the subject matter of Example 13, wherein selecting one of a word or phrase comprises selecting one of a word or a phrase that is under-represented in said ASR system training database according to a predetermined threshold.

Example 15 includes the subject matter of Example 13 or 14, wherein selecting one of a word or phrase comprises selecting one of a word or a phrase based upon an n-gram distribution on a language.

Example 16 includes the subject matter of Example 15, wherein selecting one of a word or a phrase based upon an n-gram distribution comprises applying a Needleman-Wunsch algorithm, the method further comprising computing a lowest cost alignment between a sequence of phonemes corresponding to a word in a sequence of phonemes corresponding to each of a set of most likely words and selecting at least one word with a lowest cost alignment to be presented as alternative words.

Example 17 includes the subject matter of any of Examples 13 through 16, wherein selecting one of a word or phrase comprises selecting one of a word or a phrase based upon determination of words or phrases for which the ASR system makes a number of transcription mistakes exceeding a predetermined threshold.

Example 18 includes the subject matter of any of Examples 13 through 17, wherein presenting said transcript comprises presenting suggested alternative words for use in editing said transcript. In some such cases, the process further comprises: receiving amendment information for said transcript and amending said transcript based upon said amendment information; and storing said amended transcript and said audio file in said ASR system training database.

Example 19 includes the subject matter of any of Examples 13 through 18, and further includes: performing data augmentation on said audio file to generate an augmented audio file; and storing said transcript and said augmented audio file in said ASR system training database.

Example 20 includes the subject matter of any of Examples 13 through 19, and further includes one or more of: performing a training operation on said ASR system based upon said transcript and said audio file; performing a training operation on said ASR system based upon an amended version of said transcript and said audio file; performing a training operation on said ASR system based upon said transcript and an augmented version of said audio file; and performing a training operation on said ASR system based upon an amended version of said transcript and an augmented version of said audio file.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for generating training data for an automatic speech recognition (ASR) system, said method comprising:
receiving a user command to perform speech corpus gathering for an ASR system training database;
in response to receiving said user command, selecting first textual content from said ASR system training database based on identification of textual content for which said ASR system makes a number of transcription mistakes exceeding a first threshold, wherein said transcription mistakes are mistakes that said ASR system makes in recognizing and/or transcribing received audible speech into text;
at least one of (i) selecting, from said ASR system training database, second textual content having fewer than a second threshold number of occurrences that is greater than one in said ASR system training database, and (ii) selecting third textual content based upon an n-gram distribution on a language;

presenting a textual representation of selected textual content that is selected from amongst said first, second, and third textual content;

receiving, from a user, a speech utterance that is spoken by said user and that includes said selected textual content;

providing said speech utterance to said ASR system, wherein said speech utterance is represented as an audio file; and storing said audio file in said ASR system training database, wherein said ASR system training database associates said audio file that represents said speech utterance received from said user with said selected textual content.

2. The method according to claim 1, further comprising:
receiving, from said ASR system, a transcript generated from said speech utterance;
receiving amendment information for said transcript;
generating an amended transcript based on said amendment information; and
storing said amended transcript in said ASR system training database.

3. The method according to claim 1, further comprising:
performing data augmentation on said audio file to generate an augmented audio file;
receiving, from said ASR system, a transcript generated from said augmented audio file; and
storing said transcript and said augmented audio file in said ASR system training database.

4. The method according to claim 1, further comprising:
receiving, from said ASR system, a transcript generated from said speech utterance;
presenting said transcript to said user for review; and
presenting suggested alternative words for use in editing said transcript, wherein said suggested alternative words are selected from one or more alternative transcriptions, and/or based on an n-gram distribution computed on language included in said transcript.

5. The method according to claim 1, further comprising selecting additional textual content based upon an n-gram distribution on a language by:
computing a lowest cost alignment between a sequence of phonemes corresponding to a first word and a sequence of phonemes corresponding to each word in a set of words most likely to replace said first word; and
selecting at least one word having the lowest cost alignment to be presented as one or more alternative words.

6. The method according to claim 1, further comprising:
receiving, from said ASR system, a transcript generated from said speech utterance; and
performing a training operation on said ASR system based upon said transcript and said audio file.

7. A system for generating training data for an automatic speech recognition (ASR) system, said system comprising:
a selection circuit to select textual content based on identification of first textual content for which said ASR system makes a number of transcription mistakes exceeding a first threshold, wherein said transcription mistakes are mistakes that said ASR system makes in recognizing and/or transcribing received audible speech into text,
select one or more of (i) from an ASR system training database, second textual content having fewer than a second threshold number of occurrences that is greater than one in said ASR system training database, and (ii) selecting third textual content based upon an n-gram distribution on a language text;

an audio input circuit to receive a speech utterance in response to a textual representation of textual content that is selected from amongst said first, second, and third textual content, and store said speech utterance as an audio file;

an application programming interface (API) interaction circuit to interact with an ASR API so as to retrieve a transcript of said audio file;

a text input circuit to (a) receive user input including amendments to said transcript to correct perceived inaccuracies and (b) generate a modified transcript based on said user input; and a data augmentation circuit to process said audio file thereby generating a modified audio file;

wherein said ASR system training database stores an association between said modified transcript and one or both of said audio file and said modified audio file.

8. The system according to claim 7, wherein selecting the additional textual content based upon said n-gram distribution comprises applying a Needleman-Wunsch algorithm.

9. The system according to claim 7, wherein said API interaction circuit is further used to one or more of:
perform a training operation on said ASR system based upon said transcript and said audio file;
perform a training operation on said ASR system based upon said modified transcript and said audio file;
perform a training operation on said ASR system based upon said transcript and said modified audio file; and
perform a training operation on said ASR system based upon said modified transcript and said modified audio file.

10. The system according to claim 7, wherein said ASR API comprises an automatic speech recognition method and an ASR system training method.

11. A computer program product including one or more non-transitory machine-readable mediums encoded with instructions that when executed by one or more processors cause a process to be carried out for generating training data for an automatic speech recognition (ASR) system, said process comprising:
receiving, via a user interface, a command from a user to perform speech corpus gathering for an ASR system training database;
in response to receiving said command, extracting first textual content stored in said ASR system training database based on identification of textual content for which said ASR system makes a number of transcription mistakes exceeding a first threshold, wherein said transcription mistakes are mistakes that said ASR system makes in recognizing and/or transcribing received audible speech into text;
extracting, from said ASR system training database, second textual content having fewer than a second threshold number of occurrences greater than one in said ASR system training database;
presenting, via said user interface, a textual representation of extracted textual content that is selected from amongst said first and second textual content extracted from said ASR system training database;
after presenting said textual representation of said extracted textual content, receiving, from said user, a speech utterance that is spoken by said user and that includes said extracted textual content;

providing said speech utterance to said ASR system, wherein said speech utterance is represented as an audio file;

receiving a transcript for said speech utterance from said ASR system;

after presenting said textual representation of said extracted textual content, and after receiving said speech utterance, presenting said transcript for review in said user interface;

receiving, via said user interface, a modification to said transcript that is provided by said user;

generating a modified transcript based on said received modification; and storing said modified transcript and said audio file in said ASR system training database.

12. The computer program product according to claim 11, wherein extracting said textual content further comprises selecting, from said ASR system training database, additional textual content based upon an n-gram distribution on a language.

13. The computer program product according to claim 12, wherein selecting said additional textual content based upon said n-gram distribution comprises applying a Needleman-Wunsch algorithm, said process further comprising:

computing a lowest cost alignment between a sequence of phonemes corresponding to a first word and a sequence of phonemes corresponding to each word in a set of words most likely to replace said first word; and selecting at least one word having the lowest cost alignment to be presented as one or more alternative words.

14. The computer program product according to claim 11, wherein said ASR system training database associates said audio file that represents said speech utterance received from said user with said modified transcript.

15. The computer program product according to claim 11, wherein presenting said transcript presenting suggested alternative words for use in editing said transcript.

16. The computer program product according to claim 11, said process further comprising:

performing data augmentation on said audio file to generate an augmented audio file; and storing said modified transcript and said augmented audio file in said ASR system training database.

17. The computer program product according to claim 11, said process further comprising one or more of:

performing a training operation on said ASR system based upon said transcript and said audio file;

performing a training operation on said ASR system based upon said modified transcript and said audio file;

performing a training operation on said ASR system based upon said transcript and an augmented version of said audio file; and performing a training operation on said ASR system based upon said modified transcript and an augmented version of said audio file.

\* \* \* \* \*

UNITED STATES PATENT AND TRADEMARK OFFICE
CERTIFICATE OF CORRECTION

PATENT NO. : 11,011,157 B2
APPLICATION NO. : 16/189238
DATED : May 18, 2021
INVENTOR(S) : Franck Dernoncourt It is certified that error appears in the above-identified patent and that said Letters Patent is hereby corrected as shown below:

In the Claims

At Column 17, Line 17, Claim 12, please replace "wherein extracting said textual content further comprises" with --said process further comprising--.

At Column 17, Lines 18-19, Claim 12, please replace "database, additional textual" with --database, third textual--.

At Column 17, Line 22, Claim 13, please replace "said additional textual" with --said third textual--.

At Column 18, Line 8, Claim 15, please replace "transcript presenting" with --transcript comprises presenting--.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*